Patented July 9, 1935

2,007,478

UNITED STATES PATENT OFFICE 2,007,478

PRODUCTION OF NITRATES FROM METAL HALIDES

Ludwig Rosenstein, San Francisco, Calif., assignor to Shell Development Company, San Francisco, Calif., a corporation of Delaware No Drawing. Application February 2, 1931, Serial No. 513,046

7 Claims. (Cl. 23—102)

This invention relates to a process for converting halides into nitrates, more particularly to the direct conversion of inorganic halides into the corresponding nitrates by nitrogen oxides in the absence of water or water-containing substances.

It is well known that nitrates can be obtained from halides, for instance, by treating solutions of the halide with nitric acid, in any physical condition whether alone or intermixed with steam and by crystallizing out the nitrates produced. Alternatively, nitrogen peroxide has been utilized to convert solutions of bases into nitrates.

I have discovered that I can obtain complete conversion to nitrates more economically and more easily when substantially anhydrous nitrogen oxides are contacted with substantially anhydrous halides in the solid state. The nitrogen oxides may exist either in the gaseous or liquid phase. For example, I have found that when nitrogen peroxide is passed over potassium chloride, a reaction takes place

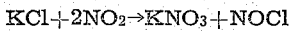

$$KCl + 2NO_2 \rightarrow KNO_3 + NOCl$$

and the potassium chloride is to a considerable extent transformed to potassium nitrate while its chlorine content is eliminated in the form of nitrosyl chloride. This reaction takes place at ordinary or elevated temperatures. When the reaction is carried out by passing a gaseous oxide of nitrogen higher than NO over solid sodium chloride the reaction is not complete and in order to obtain pure sodium nitrate this must be separated from the unchanged sodium chloride. This is accomplished readily by the well-known technique of fractional crystallization. When the nitrogen oxide in the form of a liquid is applied to the halide, and the nitrosyl chloride, whose boiling point is considerably lower than that of nitrogen oxide, is removed by the use of a fractionating column, then the reaction proceeds substantially to completion. The heat of the reaction is sufficient to supply the heat necessary for the fractionation. This operation may be carried out at atmospheric of superatmospheric pressure in case it is desired to make use of temperatures higher than the boiling point of the liquid phase. If carried out in this way, fractional crystallization will generally not be required to purify the nitrate produced. I prefer to use liquid nitrogen oxide in my process as the reaction is more complete and proceeds more rapidly than with gaseous nitrogen oxide and less difficulty is experienced with the recovery of the nitrate although use may be made of gaseous nitrogen oxide with efficacious results.

Thus far I have described my process as operating with halides in the solid state which are brought into contact with gaseous or liquid nitrogen oxides higher than NO. Under these conditions there is a tendency for the surface of the solid to become covered by the formed nitrate, and thus the reaction is stopped. To overcome this source of difficulty I propose, as an alternative method of carrying out my invention, to apply the gaseous oxides of nitrogen to the halides or mixtures of halides in the fused state. Fused nitrates of the alkali metals, for example, are miscible in all proportions with the fused halides so that the fused material remains homogeneous. A nitrogen oxide higher than NO may be contacted with fused eutectic mixtures of halides and nitrates, it being here noted that halides may or may not be continuously introduced with the nitrogen oxide to maintain constant the composition of the eutectic mixtures being treated. When halides and a nitrogen oxide higher than NO are continuously brought into contact with eutectic mixtures of halides and nitrates, there is obtained the continuous conversion of halides to the corresponding nitrates and the continuous evolution of nitrosyl halide.

My invention is applicable to any inorganic halide, more particularly to those of the alkali-metal and alkaline earth-metal groups, provided that the raw materials in every instance are substantially anhydrous and that no water be present during the course of reaction either as such or as steam, vapor and the like.

The invention can be practiced as a batch, intermittent or continuous process. For example, the nitrosyl chloride formed can be decomposed into nitrogen oxides, as by heat, catalytic oxidation or reaction with various products such as metallic iron or other treatment, and returned as such to the system to convert more halides into nitrates.

Any of the oxides of nitrogen may be utilized in my process, and by nitrogen oxide I contemplate such compounds as nitrogen peroxide, nitrous anhydride, nitrogen tetroxide and nitrogen pentoxide which are oxides of nitrogen higher than NO.

The nitrogen oxides may be used with or without admixture of air and/or oxygen and two or more of the oxides may be used concurrently.

The nitrosyl chloride formed in my process has many uses. It may, for example, be used to react with hydrocarbons, saturated or unsaturated; it may be used to produce sulphuric acid and hydrochloric acid by reaction with sulphur dioxide and water; it may be used to produce desirable metallic chlorides, for example, anhydrous aluminum chloride. Various other possible uses of nitrosyl chloride will occur to chemists, but particular methods of disposing of this substance are no part of the subject of this invention.

By my process I am able to provide an economical and efficient method for the recovery of nitrogen oxide fumes formed in the arc process of fixing nitrogen or in the oxidation of ammonia and the like and am able to produce a non-hygroscopic concentrated fertilizer material that is particularly adapted for use in the preparation of concentrated fertilizer mixtures. My process is also adapted to serve as an improved mode of production of nitrosyl chloride.

The process does not involve the use of a solution in any step and the corrosion of the apparatus is thereby greatly reduced.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A continuous process for treating metal halides comprising reacting a nitrogen oxide higher than NO with metal halides in the fused state, all substantially in the anhydrous state, separating the nitrates formed from the unchanged halides, recovering the nitrogen of the evolved nitrosyl halide as nitrogen peroxide and returning the nitrogen peroxide to the unchanged halides.

2. A process for treating halides of the alkali-metal and alkaline-earth-metal groups comprising reacting a nitrogen oxide higher than NO with said halides in the fused state.

3. A process for treating halides comprising directly reacting a nitrogen oxide higher than NO with alkali fused metal chlorides in the fused state.

4. A process for treating halides comprising, reacting a nitrogen oxide higher than NO with a metal halide in the fused state in a substantially anhydrous system.

5. A process for treating halides comprising, reactng a nitrogen oxide higher than NO with a eutectic mixture of a metal halide and a metal nitrate in the fused state and in a substantially anhydrous system.

6. A process for treating halides comprising, reacting a nitrogen oxide higher than NO with a eutectic mixture of a metal halide and a metal nitrate in the fused state while introducing a metal halide to maintain constant the composition of the eutectic mixture being treated.

7. A continuous process for treating halides comprising, reacting a nitrogen oxide higher than NO with a metal halide in the fused state in a substantially anhydrous system, separating the nitrate formed from the unchanged halide, recovering the nitrogen of the nitrosyl halide as nitrogen peroxide and returning the nitrogen peroxide to the unchanged halide.

LUDWIG ROSENSTEIN.